July 15, 1958  R. RODAL  2,842,986
ROTARY INDEXING APPARATUS
Filed Feb. 25, 1954  7 Sheets-Sheet 1
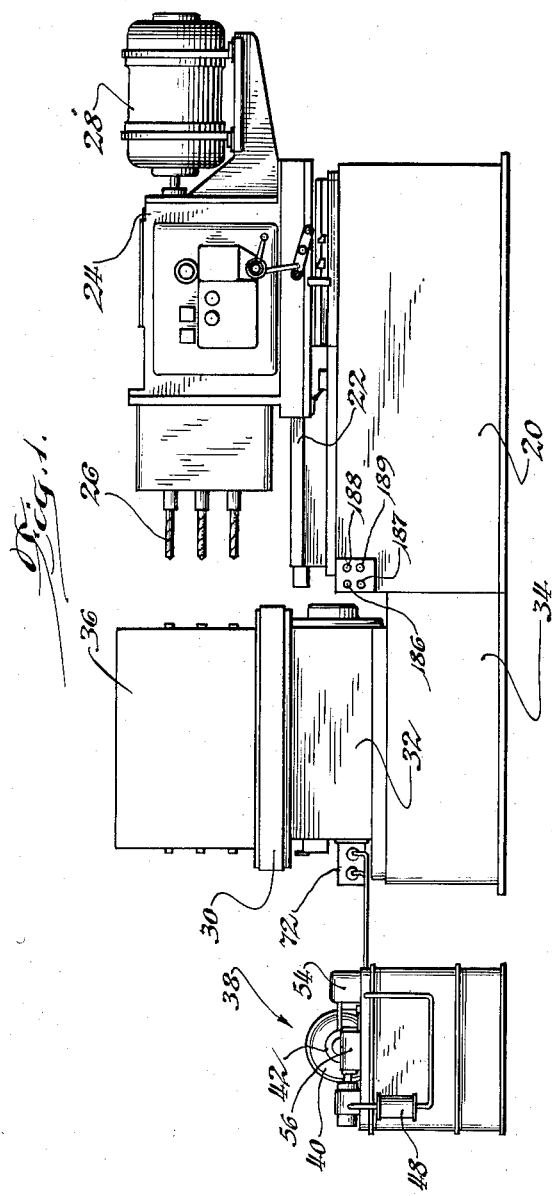
INVENTOR.
Ralph Rodal
BY Ahlberg, Wupper & Gradolph
Attorneys.

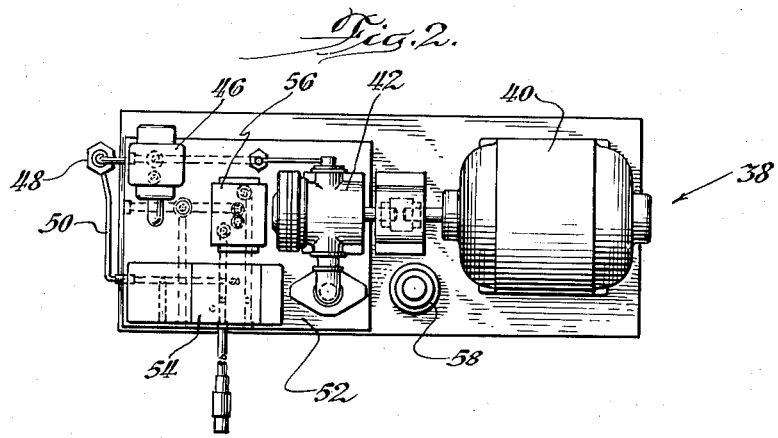
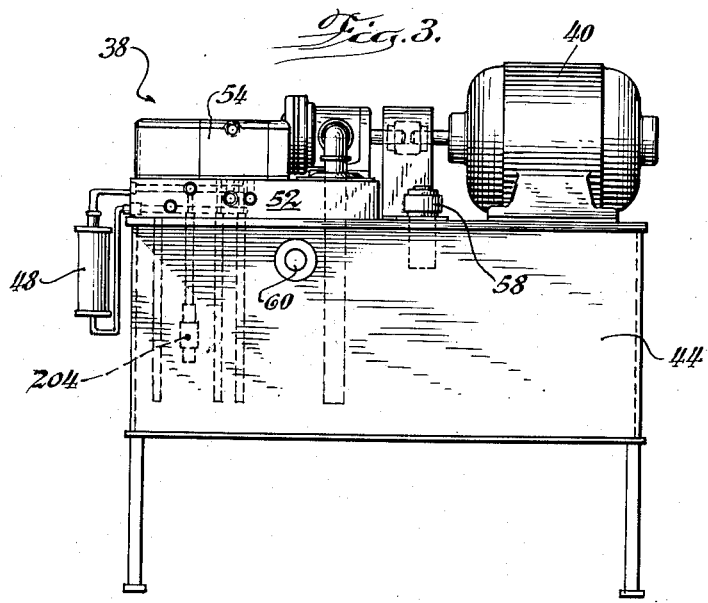

July 15, 1958 R. RODAL 2,842,986
ROTARY INDEXING APPARATUS
Filed Feb. 25, 1954 7 Sheets-Sheet 3

INVENTOR.
Ralph Rodal
BY Ahlberg, Wupper, & Gradolph
Attorneys.

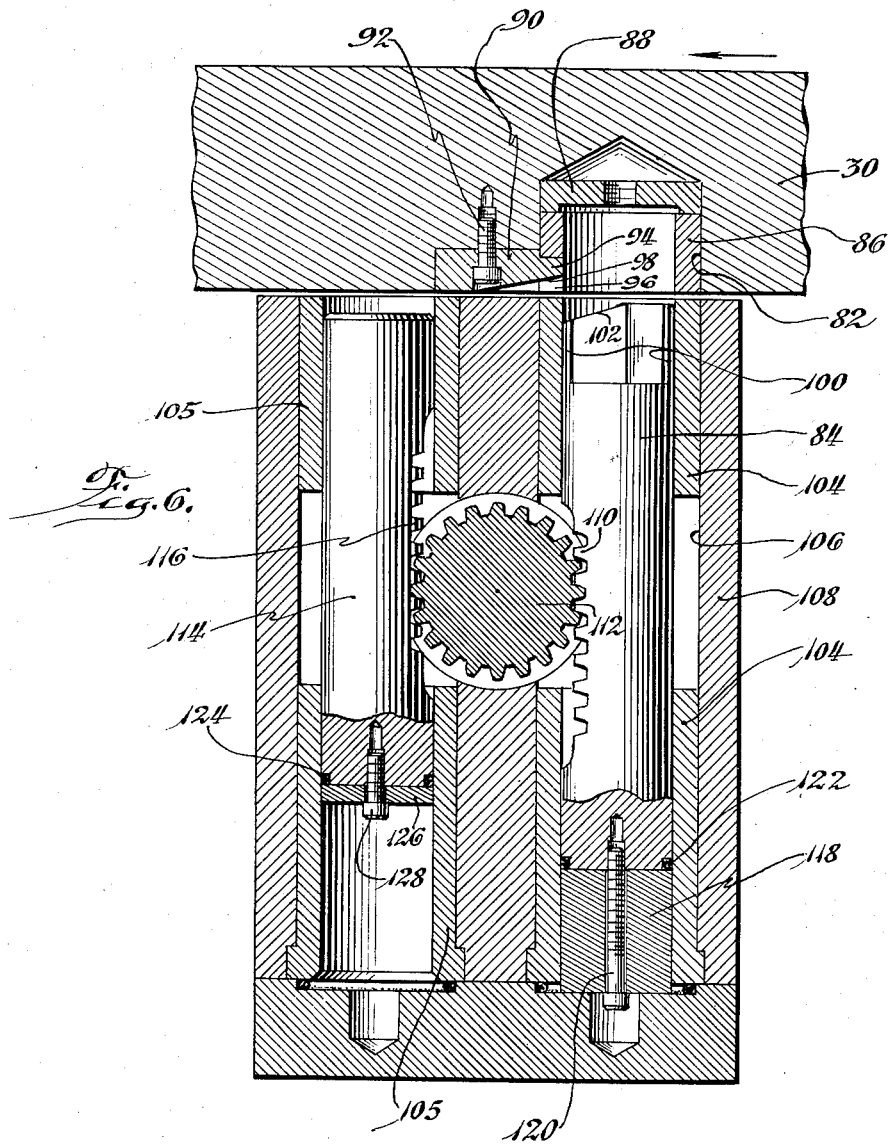

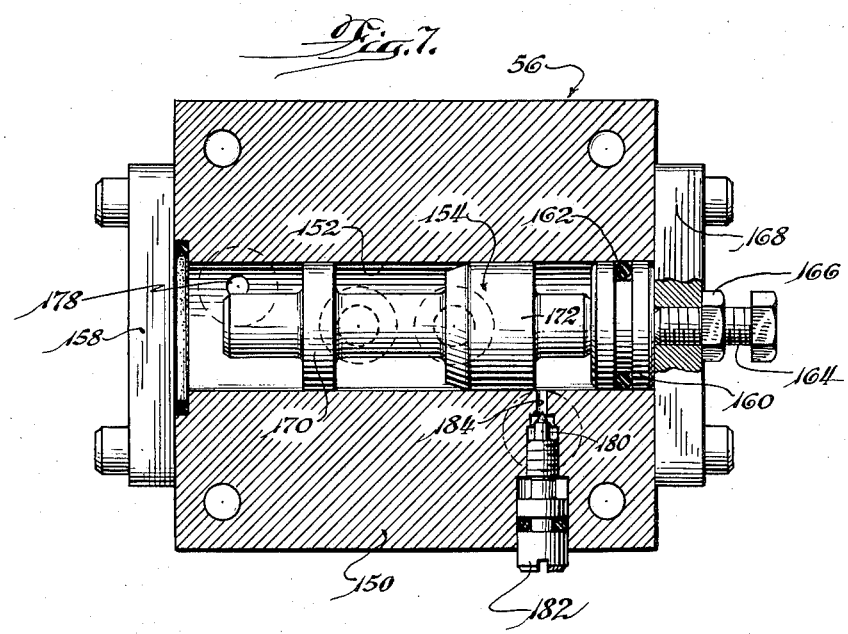
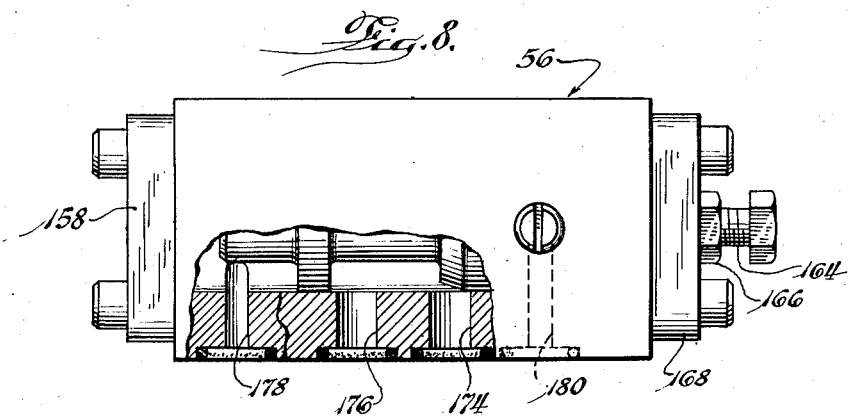

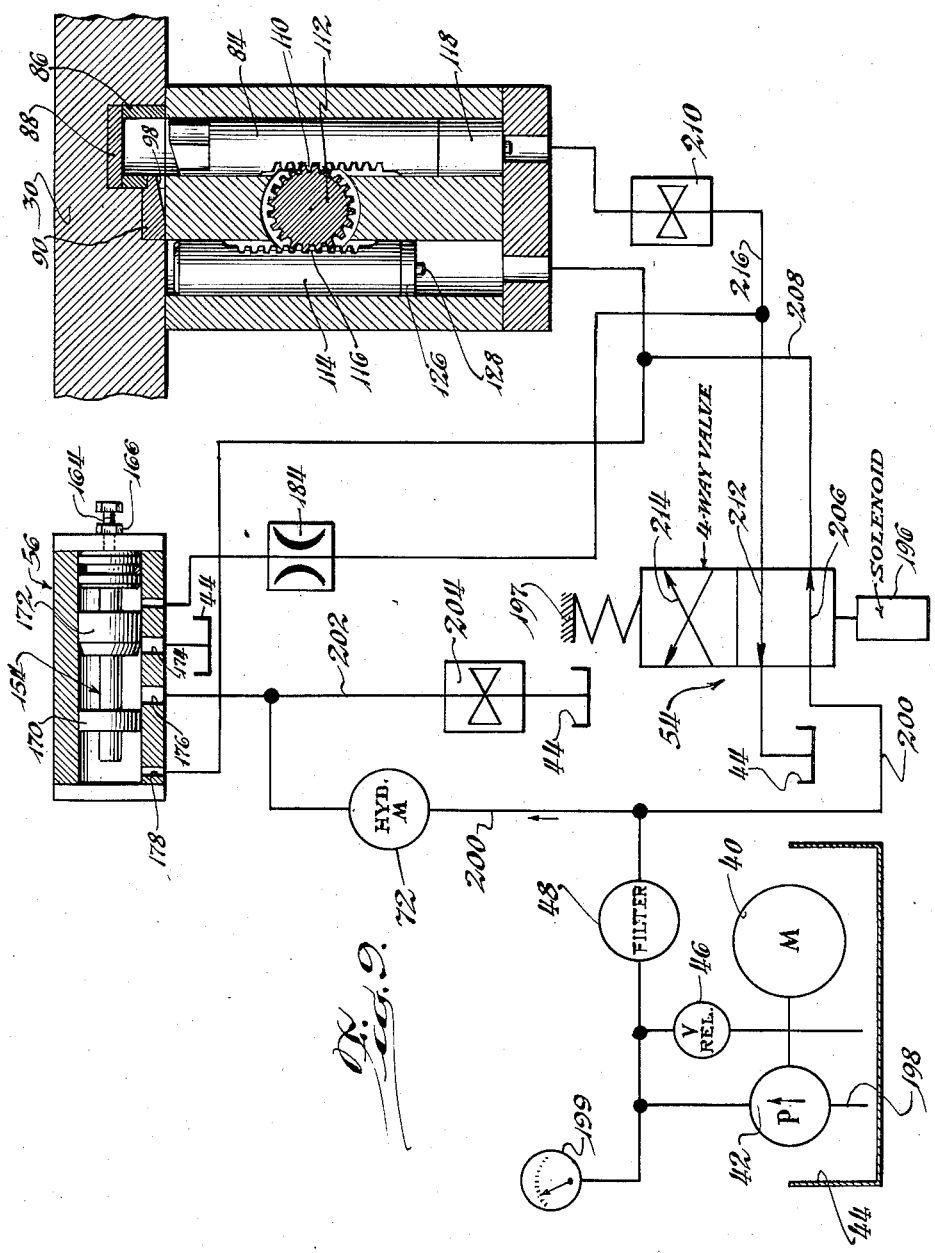

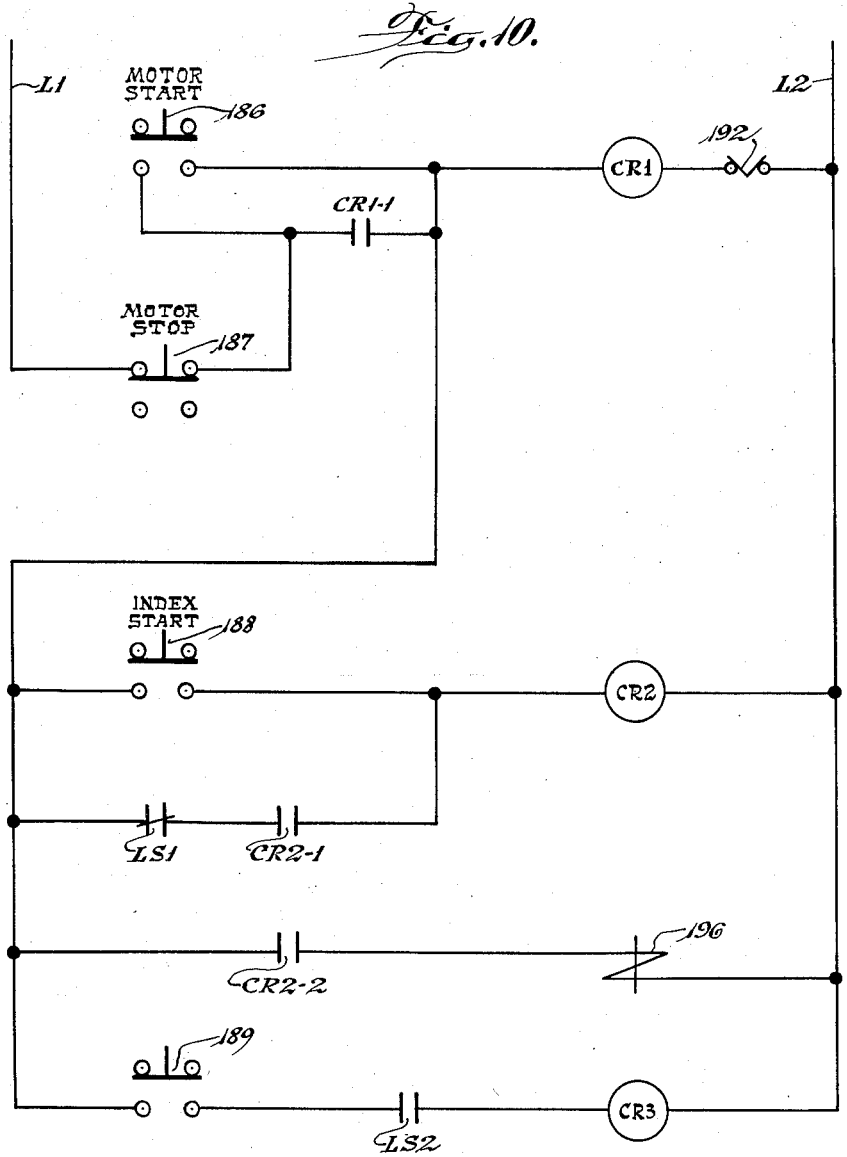

United States Patent Office 2,842,986
Patented July 15, 1958

2,842,986

ROTARY INDEXING APPARATUS

Ralph Rodal, Richmond, Ind., assignor to National Automatic Tool Company, Inc., Richmond, Ind., a corporation of Indiana Application February 25, 1954, Serial No. 412,490

3 Claims. (Cl. 77—64)

The present invention relates generally to indexing mechanisms and apparatus, and more particularly to hydraulically operated means for indexing rotary workpiece holding tables forming parts of machine tools.

An object of the invention is to provide an improved indexing mechanism for workpiece carrying tables, which is hydraulically operated and electrically and hydraulically controlled.

A further object is to provide an improved indexing apparatus for a workpiece carrying table indexed by a hydraulic motor, in which the speed of operation of the motor is retarded as the table approaches each indexed position in a manner which provides a superior control of this phase of the table movement.

A further object is to provide an improved apparatus for indexing machine tools, which is relatively simple in construction and operation and is operable to position the table at one of several stations with a high degree of accuracy providing positive assurance against over-travel of the table.

Other objects will become apparent from the following description, reference being had to the accompanying drawings, in which—

Fig. 1 is a side elevation of a machine tool incorporating the invention;

Fig. 2 is a plan view of the hydraulic reservoir, pump, and valve assembly constituting the major hydraulic components of the apparatus;

Fig. 3 is a side elevation of the unit shown in Fig. 2;

Fig. 6 is a fragmentary vertical sectional view, taken on the line 6—6 of Fig. 4, shown to a larger scale;

Fig. 7 is a horizontal sectional view of the table retarding control valve;

Fig. 8 is a side elevational view of the retarding valve, portions thereof being shown in section;

Fig. 9 is a schematic diagram of the hydraulic system of the apparatus; and

Fig. 10 is a schematic wiring diagram of the electrical portions of the apparatus.

Figure 4:
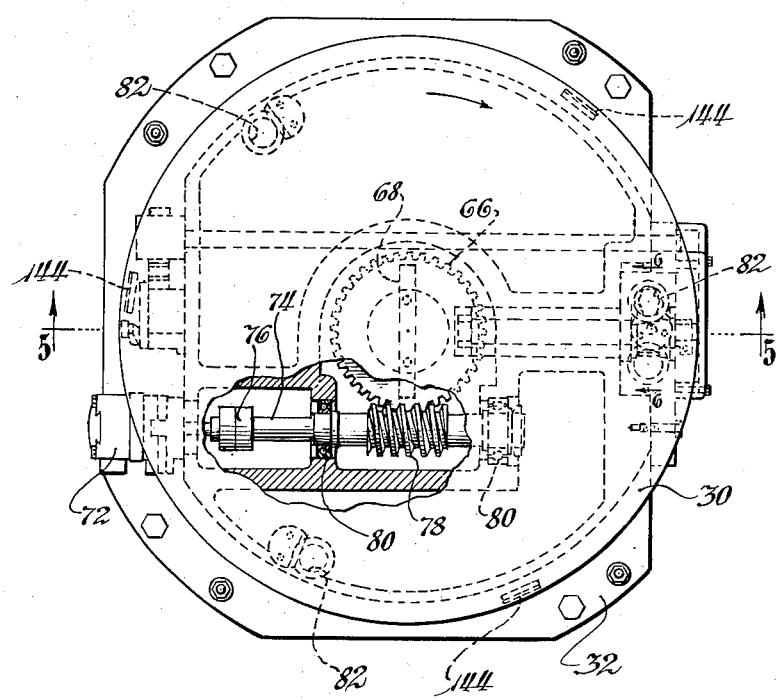
Fig. 4 is a plan view of the indexing table, portions of the top thereof being broken away to show the drive.

In many types of machine tools it is desirable to index the workpiece holding table successively to several indexed positions, and it is required that the indexing be extremely accurate because the degree of accuracy of the machining operation such as drilling, reaming, tapping, milling, etc., is in part determined by the degree of accuracy with which the table is located. Furthermore, the indexing must take place at a relatively high speed in order to reduce the elapsed time of a particular machining operation, and in addition, the table should be stopped with a minimum of shock so that it may have a long useful life. The indexing mechanism and apparatus herein disclosed has these desirable characteristics.

In Fig. 1 there is shown an illustrative machine tool embodying the workpiece carrying rotary table and indexing mechanism of the invention. The machine shown is a drilling machine and comprises a bed 20 having customary ways 22 upon which is mounted a head 24. The cutting tools 26 are driven by a motor 28. The head is reciprocated under suitable control by a suitable hydraulic jack type of motor, or other means, in the usual manner, the motor being mounted within the bed 20.

A rotary table 30 is supported on a base 32, which in turn is secured to a bed 34. The bed 34 may be integral with the bed 20, or rigidly secured thereto. A fixture 36 for the workpieces is suitably secured to the table 30.

A hydraulic assembly 38 comprises an electric motor 40 driving a hydraulic pump 42 (see Figs. 2 and 3) which withdraws oil from a reservoir 44 and delivers oil under pressure to a pressure relief valve 46, which permits the oil to return to the reservoir when a pressure of approximately 400 p. s. i. is attained in the discharge conduit of the pump. The pumped oil flows through an oil filter 48 and conduit 50 into a manifold block 52 upon which are mounted a solenoid operated fourway valve 54 of conventional construction, a retardation control valve 56, as well as the relief valve 46 and pump 42. The reservoir 44 is provided with a filling cap 58 and an oil level sight gauge 60.

Figure 5:
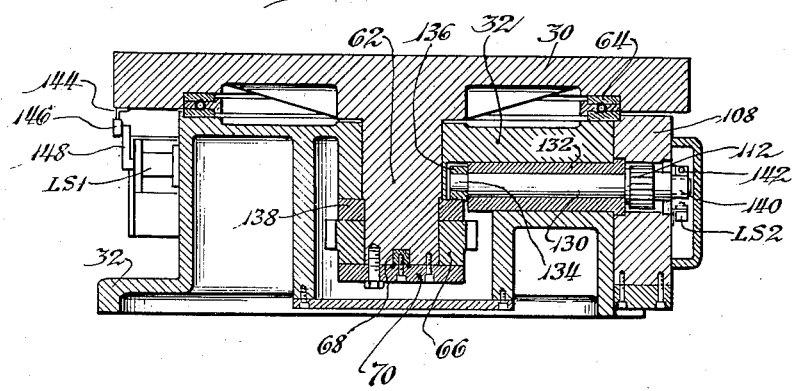
Fig. 5 is a central vertical sectional view, taken on the line 5—5 of Fig. 4.

Referring to Figs. 4, 5, and 6, the workpiece carrying table 30 has a central depending journal 62 which bears in the suitable bearing formed in the bed 32. The table rests upon antifriction thrust bearings 64. A worm gear 66 is secured to the bottom of the journal 62 and is prevented from rotation thereon by a key 68 carried by an end plate 70. The table is rotated by a rotary hydraulic motor 72 suitably mounted on the bed 32. This motor drives a worm shaft 74 through a flexible coupling 76. The shaft 74 has a worm 78 formed thereon and is mounted in suitable antifriction bearings 80.

The particular table shown in designed to have three index positions providing a station at which the workpiece is inserted and clamped in the fixture, a station at which the machining operation is performed, and an unloading station at which the workpiece is removed from the fixture. As indicated in Fig. 4, there are therefore three locating holes 82 for the reception of a shot bolt 84 (Fig. 6). To secure accuracy and permit easy reconditioning of the machine, each of the holes is provided with a liner bushing 86 which fits tightly in the hole 82. A centrally bored and threaded plate 88 is provided to facilitate removal of the bushing 86 for replacement thereof should it become worn.

A lead-in shoe 90 is secured in a suitable recess formed in the table 30 adjacent the closed end bore 82 by a pair of cap screws 92. The shoe 90 has a key portion 94 which projects into a suitable locating slot 96 formed in the lower edge of the bushing 86. A portion of the lower surface of the shoe 90 is beveled, as indicated at 98. The upper end of the shot bolt 84 has portions cut away, as shown in Fig. 6, so that the areas of contact between the shot bolt and the bushing 86 comprise arcuate surfaces 100 of approximately 60° width so that the angular position of the table 30 will be located with a high degree of precision. One-half of the top of the shot bolt is beveled as indicated at 102.

The table is indexed in a clockwise direction, as shown in Fig. 4, and thus in Fig. 6 moves in an arc toward the left. The beveled surfaces on the end of the slot bolt and the beveled surface 98 of the shoe 90 thus permit the shot bolt to move upwardly beyond the lower surfaces of the table a substantial distance before the table reaches its index position, in which the shot bolt is in alignment with the bushing 86. The upper end of the shot bolt therefore partially projects into the bushing 86 and will stop the table in its indexed position. Thus the table cannot move beyond the position in which it is to be indexed and the timing of the upward movement of the shot bolt need not be as precisely controlled as would otherwise be necessary.

The shot bolt 84 is accurately fitted for vertical sliding movement in a pair of liners 104 which are pressed in a bore 106 formed in a block 108 which is suitably secured to the bed 32. The shot bolt 84 has rack teeth 110 cut in the central portion thereof, these teeth being in mesh with a pinion 112.

A plunger 114 is mounted in the block 108 in the same manner as the shot bolt is mounted in liners 105, and has a rack 116 formed thereon in meshing engagement with the pinion 112. The shot bolt 84 has an extension 118 secured thereto by a cap screw 120 and the lower end of the shot bolt is annularly grooved to receive a sealing ring 122 which is held in place by the extension 118. Similarly, the lower end of the plunger 114 is annularly grooved to receive a sealing ring 124 which is held in place by a plate 126 secured by a cap screw 128. Thus the sealing rings may be easily replaced by the removal of the extension 118 and plate 126.

As best shown in Fig. 5, the pinion 112 is formed on a shaft 130 journaled in a radially extending long bushing 132, the bushing being mounted in the base 32. The inner end of the shaft 130 has an eccentric portion 134 which extends into a clamping block 136. The arrangement is such that as the shot bolt 84 is moved upwardly into a locating bushing 86, the clamping block is pressed downwardly against the upper surface of a ring 138 and thus applies a downwardly directed force upon the table to hold the table rigidly in position.

A miniature limit switch LS2 is secured to the block 108 adjacent the outer end of the shaft 130, and is adapted to be closed by an arm 140 of a member 142 which is clamped to the reduced diameter end portion of the shaft 130. The switch is closed whenever the shot bolt 84 is projected fully into one of the locating bushings 86.

Three angle shaped cam-like dogs 144 (Figs. 4 and 5) are adjustably secured to the bottom of the table 30 near its periphery, and are adapted to engage the roller 146 at the end of an arm 148 of a limit switch LS1, this switch being suitably mounted on the base 32. This switch, as will hereinafter appear, is connected in a circuit so that when the switch is opened the speed of operation of the hydraulic motor 72 is retarded so as to reduce the impact of the bushing 86 against the shot bolt 84, as will hereinafter be further described. The limit switch LS2 is in the control circuit for the head 24 to permit traverse of the head 24 while the shot bolt is in its table locking position.

The construction of the retardation control valve 56 is best shown in Figs. 7 and 8, and comprises a valve block 150 having a bore 152 therein. A plunger valve 154 is reciprocable in the bore 152. One end of the bore is closed by a suitably sealed plate 158, while the other end is closed by a movable stop plug 160 provided with an annular groove for a sealing ring 162. The position of the stop plug 160 may be adjusted by means of an adjusting screw 164 locked in place by a lock nut 166, the screw 164 being threaded in a plate 168 secured to the block 150.

The plunger or spool valve 154 is provided with two spaced lands 170 and 172 and suitable end projections to limit the extent of its movement in the bore 152. The land 172 has a beveled edge which normally overlies a port 174 which leads to the reservoir. A port 176 is connected to the return line of hydraulic motor 72 while a port 178 is connected in a hydraulic system hereinafter to be described, in such manner as to cause rightward (Figs. 7 and 8) movement of the valve 154 under certain conditions. A fourth port 180 at the right-hand end of the bore 152 leads to a chamber of an adjustable needle valve 182, which may be adjusted by a screwdriver to meter the oil flow through a port 184 to the right-hand end of the bore 152 to cause movement of the valve 154 to the left under certain circumstances. Adjustment by means of the screw 164 limits the stroke of the valve 154 and determines the distance it has to move to the left from its rightmost position, shown in Fig. 7, before it will cut off the flow of oil from the pump 72, while adjustment of the needle valve 182 determines the rate at which the valve 154 will move from its extreme right position to its leftmost position during a certain portion of the operating cycle.

The manner of operation of the indexing mechanism can best be understood by reference to the diagrams shown in Figs. 9 and 10. Initially, it will be noted from Fig. 1 that the machine is provided with a push button station having four push button switches 186, 187, 188, and 189. Asssuming that the tools are withdrawn from the work and that the shot bolt is in table locking position, to commence operation the operator depresses the Motor Start push button 186. This completes a circuit from line L1 through the push button operated Motor Stop switch 187 to a magnetic starter CR1 which causes starting of the pump driving motor 40, the circuit through this starter being completed through an overload relay 192 to line L2. The starter CR1 includes a switch CR1-1 which is closed upon energization of the starter, and completes a holding circuit from the Motor Stop push button switch 187 to the starter CR1. The operator then presses the Index Start push button switch 188 which results in energization of control relay CR2. This relay has normally open contactor CR2-1, which in series with normally closed limit switch LS1, completes a holding circuit for relay CR2. Energization of CR2 also results in closing the normally open contactor CR2-2, which results in energizing solenoid 196 (Fig. 9) which forms part of the solenoid operated four-way valve 54.

Referring to Fig. 9, the electric motor 40 drives the pump 42 which withdraws oil from near the bottom of reservoir 44 through an intake pipe 198. Oil from the pump is supplied to a presssure gauge 199, the pressure release valve 46, and filter 48, to a supply line 200 to the hydraulic motor 72. The return line 202 from the hydraulic motor has one branch leading to a pressure reducing apertured flow control valve 204 to the diagrammatically indicated reservoir 44. This valve may be of any well known type, for example, such as that shown in the patent to Amsler No. 1,467,522.

Another branch of the return line 202 leads to port 176 of the retarding valve 56, from which it may flow through the space between the lands 170 and 172 to the discharge port 174.

As indicated above, when the solenoid 196 is energized, oil under pressure from the main supply line 200 flows through the passageway 206 of the four-way valve to conduit 208, which supplies oil under pressure at the lower end of the lower bushing 105 and the plunger 114 is therefore forced upwardly, and through pinion 112 causes withdrawal of the shot bolt 84. At the same time oil under pressure flows from conduit 208 to the port 178 of the retardation control valve 56 so as to force the valve plunger 154 thereof to the right. The rate at which this plunger moves to the right will be determined by the adjustable needle valve restriction 184 from which the oil returns to the reservoir—through passageway 212 in the four-way valve 54.

The hydraulic motor 72 operates initially at a speed controlled by the pressure regulator and aperture device 204, and shortly thereafter, in addition, by the area of the port 174 in the valve 56 which is uncovered by the land 172.

The motor 72 thus continues operating at an initially accelerating rate, and thereafter at constant speed, to rotate the table 30 until one of the cams 144 engages and opens limit switch LS1 (Figs. 4 and 5). This limit switch is opened while the table is still some distance from the position in which it is to be indexed, and as shown in Fig. 10, opening this switch results in deenergizing control relay CR2, which in turn deenergizes contactors CR2-2 and thus deenergizes solenoid 196, whereupon a compression spring 197, diagrammatically indicated in Fig. 9, moves the four-way valve to its other extreme position. When the valve 54 is in this position, oil under pressure from the main conduit 200 flows through passageway 214 and conduit 216 to the pressure regulating aperture device 210 (similar to the device 204), which controls the rate at which the oil may flow into the lower end of the shot bolt cylinder, and the shot bolt commences to rise to its locking position. At the same time, oil flows through the adjustable restriction provided by the needle valve 184 to the right-hand end of the bore 152 of the retardation control valve 56.

Depending upon the settings of the needle valve and the adjusting screw 164, the retardation control valve plunger 154 will move to the left to cover the port 174 more or less rapidly, and thus gradually decrease the rate at which the oil from the discharge of the hydraulic motor 72 may return to the reservoir 44. After the plunger valve 154 has been moved to such position that the land 172 thereof completely covers the port 174, the speed of the hydraulic motor 72 will be determined by the flow rate through the pressure reducing aperture valve 204. The latter valve is set so that this terminal portion of the movement of the table will be very slow so that the impact of the bushing 86 against the shot bolt 84 will not result in forces exceeding the elastic limits of these parts.

As the table approaches stopping position, the upper end of the shot bolt 84 will ride along the lower surface of the table until its beveled upper end surface reaches the beveled surface 98 of the shoe 90, and, as the table continues moving slowly, the shot bolt will be forced upwardly so that before the time the table reaches the position to which it is to be indexed the shot bolt will have been projected a substantial distance into the locating bushing 86 and positively stop the table in its indexed position.

At the same time as the shot bolt moves upwardly, it operates through the gear 112, shaft 130, eccentric 134, and shoe 136 to apply a hold-down or clamping force to the table 30.

When the shot bolt 84 has been moved to full engagement with its bushing 86, limit switch LS2 is closed by the arm 142 at the outer end of the shaft 130, and the indexing cycle is thus completed. Push button switch 189 may then be depressed to energize a relay device CR3, which will cause initiation of forward traverse of the head, and through additional well known controls cause the head portion of the machine to perform a machining operation, and upon completion thereof to retract the tools and head to the position in which they are shown in Fig. 1, and thus complete a full cycle of the operation of the machine as a whole.

The rotation of the table may be stopped at any time, as during set up of the machine, merely by depressing the Motor Stop push button switch 187, and the indexing cycle may be resumed merely by again operating the Motor Start push button switch 186.

Due to the provision of the retardation control valve and associated parts, the table may be made to decelerate gradually at a desirable rate as it approaches the position to which it is to be indexed, and also to be made to move sufficiently slowly at the time the locating bushing strikes the shot bolt to avoid heavy impact between the bushing and the shot bolt.

Due to the provision of beveled surfaces on the end of the shot bolt 84 and on the shoe 90, the shot bolt is in position positively to stop the rotation of the table some time before the table is rotated to the position to which it is to be indexed, thereby assuring that there will be no overtravel of the table. The electrical and hydraulic controls cooperate with the mechanism to assure smooth and precise indexing of the table.

It will be clear that the shot bolt could be arranged to move horizontally into sockets formed in the side of the table. For this reason, terms indicating a direction are not intended to be considered in the absolute sense, but rather to define relative positions or motion.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an indexing mechanism for the work carrying table of a machine tool, the combination of a base, a central journal bearing in the base, a table having a central journal projecting into said bearing, a thrust bearing for the table, a plurality of downwardly opening socket means in the table, a shot bolt reciprocably mounted for projection of its upper end into the socket means, a rack on the side of the shot bolt, a pinion in engagement with the rack, an eccentric device cooperable with a part rigid with the table journal, and a shaft journalled in the base and connecting the pinion with the eccentric, said pinion, shaft, and eccentric being operable, as the shot bolt is moved into said socket means, to apply a downwardly directed force to the journal thereby to clamp the table against the thrust bearing.

2. In a machine tool, the combination of a bed, a workpiece support table mounted for rotary movement on said bed, a hydraulic motor connected to rotate said table in a normal direction, a pump, means for conducting operating fluid from said pump through said motor, hydraulic motor speed control means including a pressure reducing flow control valve and a second valve connected hydraulically in parallel with each other and hydraulically in series with said motor, said pressure reducing valve having an effective flow area limited to allow through the reducing valve a highly restricted flow of motor operating fluid sufficient for only very slow speed movement of said motor and table, adjustable limit means positioned to regulate the maximum degree of opening movement of said second valve, a hydraulic actuator connected to said second valve for progressively closing the latter, an extendable shot bolt element reciprocably mounted on said bed in radially spaced relation to the rotary axis of said table, a hydraulic actuator connected to said shot bolt for extending the latter, a hydraulic control valve, means connected to supply fluid under pressure to the upstream side of said hydraulic control valve, means connecting the downstream side of said hydraulic control valve to said second valve actuator and including therein adjustable means forming an adjustable orifice for regulating the rate of flow of operating fluid from said hydraulic control valve to said last mentioned actuator, means connecting the downstream side of said hydraulic control valve to said hydraulic shot bolt actuator and including therein adjustable means defining an adjustable orifice for regulating the flow of fluid from said hydraulic control valve to said last mentioned actuator, a plurality of socket elements on said table spaced circumferentially and radially with respect to said table axis for alignment successively with said shot bolt element upon rotation of the table, each socket element being oriented to receive said shot bolt element upon alignment therewith, said shot bolt element and said socket elements each defining at the outer end thereof a straight abutment surface tangent to a plane containing the rotary axis of said table and located at the side of the element opposite from the normal direction of rotary movement of the adjacent portion of the table, the outer end of said shot bolt element and each socket element brought into alignment therewith being shaped in relation to each other so that the end of one of said last mentioned elements adjacent the other element is relieved on the side thereof opposite from said abutment surface on said one element so that the abutment surfaces on said last two mentioned elements can be brought into interfering relation with each other by extension of said bolt element even before the shot bolt element and the socket element have been brought into exact mutual alignment by rotation of said table in its normal direction, and operating means for said hydraulic control valve connected with the latter and including coacting means interconnected with said bed and table for opening said hydraulic control valve as an incident to normal rotation of the table effecting an approaching alignment of any one of said socket elements with said shot bolt element.

3. In a machine tool, the combination of a bed, a workpiece support table mounted for rotary movement on said bed, a hydraulic motor connected to rotate said table in a normal direction, a pump, means for conducting operating fluid from said pump through said motor, hydraulic motor speed control means including a pressure reducing flow control valve and a second valve connected hydraulically in parallel with each other and hydraulically in series with said motor, said pressure reducing valve having an effective flow area limited to allow through the reducing valve a highly restricted flow of motor operating fluid sufficient for only very slow speed movement of said motor and table, a hydraulic actuator connected to said valve for progressively closing the latter, an extendable shot bolt element reciprocably mounted on said bed in radially spaced relation to the rotary axis of said table, a hydraulic actuator connected to said shot bolt for extending the latter, a hydraulic control valve, means connected to supply fluid under pressure to the upstream side of said hydraulic control valve, means connecting the downstream side of said hydraulic control valve to said second valve actuator and including therein adjustable means forming an adjustable orifice for regulating the rate of flow of operating fluid from said hydraulic control valve to said last mentioned actuator, means connecting the downstream side of said hydraulic control valve to said hydraulic shot bolt actuator, a plurality of socket elements on said table spaced circumferentially and radially with respect to said table axis for alignment successively with said shot bolt element upon rotation of the table, each socket element being oriented to receive said shot bolt element upon alignment therewith, said shot bolt element and said socket elements each defining at the outer end thereof a straight abutment surface tangent to a plane containing the rotary axis of said table and located at the side of the element opposite from the normal direction of rotary movement of the adjacent portion of the table, the outer end of said shot bolt element and each socket element brought into alignment therewith being shaped in relation to each other so that the end of one of said last mentioned elements adjacent the other element is relieved on the side thereof opposite from said abutment surface on said one element so that the abutment surfaces on said last two mentioned elements can be brought into interfering relation with each other by extension of said bolt element even before the shot bolt element and the socket element have been brought into exact mutual alignment by rotation of said table in its normal direction, and operating means for said hydraulic control valve connected with the latter and including coacting means interconnected with said bed and table for opening said hydraulic control valve as an incident to normal rotation of the table effecting an approaching alignment of any one of said socket elements with said shot bolt element.

References Cited in the file of this patent
UNITED STATES PATENTS

| | | |
|---|---|---|
| 1,968,990 | Carlson | Aug. 7, 1934 |
| 2,464,996 | Schafer et al. | Mar. 22, 1949 |
| 2,536,937 | Hosea | Jan. 2, 1951 |
| 2,645,981 | Hirvonen | July 21, 1953 |